(12) United States Patent
Bartko

(10) Patent No.: US 7,951,852 B2
(45) Date of Patent: May 31, 2011

(54) FREE-FLOWING COMPOSITION OF A BIOCIDE AND A PROCESSING ADDITIVE THEREWITH FOR INCORPORATION INTO A POLYMER OR PLASTIC MATRIX PRODUCT

(75) Inventor: Joseph P. Bartko, Nazareth, PA (US)

(73) Assignee: ISP Investments Inc., Wilmington, DE (US)

( * ) Notice: Subject to any disclaimer, the term of this patent is extended or adjusted under 35 U.S.C. 154(b) by 1542 days.

(21) Appl. No.: 11/100,655

(22) Filed: Apr. 7, 2005

(65) Prior Publication Data

US 2006/0229381 A1    Oct. 12, 2006

(51) Int. Cl.
*C08K 5/16* (2006.01)
*C09D 5/16* (2006.01)

(52) U.S. Cl. ........... 523/122; 524/200; 524/399; 524/35

(58) Field of Classification Search ................... 523/122; 524/200, 399, 35
See application file for complete search history.

(56) References Cited

U.S. PATENT DOCUMENTS

| 5,650,163 A | 7/1997 | Cannelongo |
| 2004/0191331 A1 * | 9/2004 | Schwartz et al. ............. 424/641 |

FOREIGN PATENT DOCUMENTS

WO   WO 2004/022846   *   3/2004

* cited by examiner

*Primary Examiner* — Kriellion A Sanders
(74) *Attorney, Agent, or Firm* — William J. Davis; Thompson Hine LLP

(57) ABSTRACT

A matrix which is a polymer, plastic or polymer-wood composite includes a composition of a biocide and a processing additive therewith in the form of a free-flowing powder.

11 Claims, No Drawings

FREE-FLOWING COMPOSITION OF A BIOCIDE AND A PROCESSING ADDITIVE THEREWITH FOR INCORPORATION INTO A POLYMER OR PLASTIC MATRIX PRODUCT

CROSS-REFERENCE TO RELATED U.S. PATENT APPLICATION

This application is related to U.S. patent application Ser. No. 10/893,009, filed Jul. 16, 2004 and assigned to the same assignee as herein.

BACKGROUND OF THE INVENTION

1. Field of the Invention

This invention relates to industrial matrix products which require a biocide for antibacterial protection, and, more particularly, to a composition including a biocide and a processing additive therewith which is in the form of a free-flowing powder suitable for processing by automatic feeding equipment into polymer and plastic products.

2. Description of the Prior Art

IPBC (3-iodo-2-propynl butyl carbamate) is a well known preservative/antibacterial in cosmetic, paint and coating formulations; it can be added readily to such formulations at room temperature. However, IPBC is difficult to handle in industrial products such as polymers and plastics, because it tends to be clumpy and sticky. More particularly, it cannot be fed easily from blending equipment and automatic feeding devices. Moreover, it is necessary to physically break up clumps of IPBC to provide a good dispersion of the material when processing it into polymer and plastic compositions and polymer-wood composites. Even if chunks of IPBC are pulverized the powders reclump quickly into an undesired form for handling in industrial production of plastic and polymer products. Other biocides are fine and sticky powders, that, upon mixing with other ingredients, cling to the walls of the mixing vessel; accordingly, it is difficult to predetermine their use levels, and it also creates a hazardous clean-up situation.

For these reasons, it is an object of this invention to provide a composition containing a biocide, e.g. IPBC, 3-iodopropynyl carbamate (IPC), or 3-iodopropynyl-N-phenyl carbamate (IPPC), and a processing aid, in the form of a free-flowing powder capable of being processed conveniently into industrial polymer or plastic products by automatic feeding equipment.

These and other objects and features of the invention will be made apparent from the following description.

SUMMARY OF THE INVENTION

What is described herein is a composition of a biocide, e.g., IPBC, and a processing additive therewith, in the form of a free-flowing powder suitable for automatic feed processing of the biocide into industrial matrix products such as a polymer, plastic or a wood-plastic composite.

DETAILED DESCRIPTION OF THE INVENTION

The processing additive is in the form of a powder and can be selected from a variety of polymers and plastics including various olefins, vinyl polymers, such as polyvinylchloride (PVC), polyurethanes, polycarbonates and the like. In preferred embodiments the polymeric processing additive is the same polymer in the industrial matrix product. The polymeric component of the processing agent can be present in an amount of 0.1-10 wt. %, preferably 1-5 wt. % based on the weight of the biocide present.

A particularly preferred processing additive for IPBC and other biocides in this invention includes a mixture of (a) calcium stearate and/or zinc stearate, in an amount, by wt., of 0.1% up to about 15%, and (b) of 0.1% up to about 10%, of the polymer of the industrial matrix product itself.

Suitable olefin polymers include HDPE (high density polyethylene), LDPE (low density polyethylene), LLDPE (linear low density polyethylene), PP (polypropylene), HDPP (high density polypropylene), LDPP (low density polypropylene), UHMWPE (ultra high molecular wt. polyethylene) and MPE (metallocene/polyethylene).

Other polymers and plastics which can be stabilized by the compositions of the invention include ethylene vinyl acetate (EVA) copolymers, polyurethanes, polycarbonates, vinyl polymers, such as polyvinylchloride (PVC) and flexible PVC, and the like. The invention can be practiced with a wide variety of polymers and plastics.

Optional ingredients may be included in the matrix without affecting the stability of the biocide, e.g., colorants, light and UV stabilizers, anti-static agents, coupling agents, fillers, extenders, reinforcing agents, calcium carbonate, talc, mica, silica, kaolin, impact modifiers, glass fibers, carbon fibers blowing agents, flame retardants, wood and wood flour, and the like.

Other suitable industrial matrix products which may be stabilized herein include wood-plastic composites, shower curtains, cable and wire insulation, filter medias, polymer components of carpet, seat cushions, hose, pipe, flooring, decking, window frames, fencing, automobile interiors, pallets, carpet backing, PVC pipes, roofing membranes and outdoor furniture.

The invention will now be described by reference to the following examples.

EXAMPLE (A) Commercial IPBC material was removed from its packaging drum by chipping out chunks of the material and manually pulverizing into a powder. After 24 hours the biocide retained its chunkiness and was difficult to cause to flow. At the same time, a small amount of calcium stearate was added to another jar with two loadings of the calcium stearate. Another jar containing a small amount of calcium stearate and polyethylene granules was added to the IPBC. The control needed to be agitated to make it powdery again. In contrast, samples with calcium stearate and polyethylene additive therein flowed easily.

(B) CTL (tetrachloroisophthalonitrile) and Folpet were placed into similar jars with the same small amounts of calcium stearate and polyethylene. The tendency to stick to the walls of the jar and clump together was eliminated and the powders remained free-flowing.

Sample
1 IPBC alone
2 IPBC and 5 wt. % calcium stearate
3 IPBC and 2 wt. % calcium stearate and 2 wt. % polyethylene
4 IPBC and 0.5 wt. % calcium stearate and 1 wt. % polyethylene
5 CTL and 2 wt. % calcium stearate and 4 wt. % polyethylene
6 Folpet and 1 wt. % calcium stearate and 1 wt. % polyethylene 7 IPBC and 0.5 wt. % calcium stearate and 2 wt. % PVC resin 8 IPBC and 0.1 wt. % calcium stearate and 2 wt. % ethylene vinyl acetate In summary, by mixing in 1-2% of an appropriate resin with the IPBC and/or mixing in 1% resin and 1% of a dry lubricant such as calcium stearate or zinc stearate, the stickiness of the IPBC biocide is eliminated and a free-flowing powder is obtained. Thus, continuous additive feeding equipment can be used for the biocide which renders it easier to weigh out the appropriate use levels of the biocide. Moreover, it has been discovered that the invention can reduce and or mask odors associated with the biocide.

While the invention has been described with particular reference to certain embodiments thereof, it will be understood that changes and modifications may be made which are within the skill of the art.

What is claimed is:

1. A composition comprising a biocide and a processing additive therewith in the form of a free-flowing powder for facile incorporation into an industrial matrix product which is a polymer, plastic or polymer-wood composite.

2. A composition according to claim 1 wherein said biocide contains an iodopropynyl group and is selected from iodopropynyl butyl carbamate (IPBC), 3-iodopropynyl carbamate and 3-iodopropynyl-N-phenyl carbamate.

3. A composition according to claim 2 wherein said biocide is IPBC.

4. A composition according to claim 1 wherein said processing additive is a combination of calcium stearate and/or zinc stearate and said polymer, plastic or polymer-wood composite.

5. An industrial matrix product comprising the composition of claim 1 and a polymer, plastic or polymer-wood composite.

6. An industrial matrix product according to claim 5 wherein said product comprises a polyolefin, flexible polyvinylchloride, a polyurethane or a polymer-wood composite.

7. A composition according to claim 1 wherein said processing additive is present in an amount of 0.1% to about 25% by weight based on the weight of the biocide.

8. A composition according to claim 1 wherein said processing additive comprises calcium stearate and/or zinc stearate in an amount, by weight, of 0.1% up to about 15%.

9. A composition according to claim 1 wherein said processing additive comprises 0.1% up to about to 10% by weight of the polymer, plastic or polymer-wood composite.

10. A composition according to claim 4 wherein the calcium stearate and/or zinc stearate is present in an amount, by weight, of 0.1% up to about 15%.

11. A composition according to claim 4 wherein said polymer, plastic or polymer-wood composite is present in an amount of 0.1% up to about 10% by weight based on the weight of the biocide.

* * * * *